(12) United States Patent
Shumsky et al.

(10) Patent No.: US 9,459,829 B2
(45) Date of Patent: *Oct. 4, 2016

(54) LOW LATENCY FIRST-IN-FIRST-OUT (FIFO) BUFFER

(71) Applicant: Marvell Israel (M.I.S.L.) Ltd., Yokneam (IL)

(72) Inventors: Evgeny Shumsky, Petah Tikva (IL); Jonathan Kushnir, Petah Tikva (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,882

(22) Filed: Jul. 15, 2014

(65) Prior Publication Data
US 2015/0006770 A1 Jan. 1, 2015

Related U.S. Application Data

(63) Continuation of application No. 13/208,675, filed on Aug. 12, 2011, now Pat. No. 8,819,312.

(60) Provisional application No. 61/385,919, filed on Sep. 23, 2010.

(51) Int. Cl.
| G06F 5/00 | (2006.01) |
| G06F 5/12 | (2006.01) |
| G06F 5/14 | (2006.01) |
| G06F 5/16 | (2006.01) |
| G06F 5/06 | (2006.01) |

(52) U.S. Cl.
CPC ............... *G06F 5/12* (2013.01); *G06F 5/065* (2013.01); *G06F 5/14* (2013.01); *G06F 5/16* (2013.01); *G06F 2205/065* (2013.01); *G06F 2205/126* (2013.01)

(58) Field of Classification Search
CPC ...... G06F 5/16; G06F 2205/065; G06F 5/14; G06F 5/12; G06F 2205/126
USPC .......................................................... 710/57
See application file for complete search history.

(56) References Cited

U.S. PATENT DOCUMENTS

| 6,381,659 B2 | 4/2002 | Proch et al. |
| 7,254,677 B1 | 8/2007 | Lowe et al. |
| 2003/0112051 A1 | 6/2003 | Wakayama et al. |
| 2005/0138243 A1* | 6/2005 | Tierney ................. H04L 47/10 710/52 |

(Continued)

OTHER PUBLICATIONS

International Search Report and Written Opinion of the International Searching Authority for Appl. No. PCT/IB11/002510 dated Sep. 28, 2012 (9 pages).
2nd Office Action issued dated Feb. 6, 2016 in related/corresponding Chinese Patent Appl. No. 2011800460230.
Valvano, Jonathan W., Embedded Microcomputer Systems: Real Time Interfacing, China Machine Press, Printed Jan. 28, 2016.

(Continued)

*Primary Examiner* — Ernest Unelus

(57) ABSTRACT

Systems and methods are provided for a first-in-first-out buffer. A buffer includes a first sub-buffer configured to store data received from a buffer input, and a second sub-buffer. The second sub-buffer is configured to store data received from either the buffer input or the first sub-buffer and to output data to a buffer output in a same order as that data is received at the buffer input. Buffer control logic is configured to selectively route data from the buffer input or the first sub-buffer to the second sub-buffer so that data received at the buffer input is available to be output from the second sub-buffer in a first-in-first-out manner.

12 Claims, 9 Drawing Sheets

(56) References Cited

U.S. PATENT DOCUMENTS

2009/0019193 A1    1/2009   Luk
2010/0019757 A1    1/2010   Tiwari et al.

OTHER PUBLICATIONS

3rd Office Action dated May 23, 2016 issued in related/corresponding Chinese Patent Appl. No. 201180046023.0.

* cited by examiner

LOW LATENCY FIRST-IN-FIRST-OUT (FIFO) BUFFER

CROSS-REFERENCE TO RELATED APPLICATIONS

This application is a continuation of U.S. application Ser. No. 13/208,675, filed on Aug. 12, 2011, which claims priority to U.S. Provisional Application No. 61/385,919, filed on Sep. 23, 2010, entitled "jFIFO," the entirety of which is herein incorporated by reference.

FIELD

The technology described herein relates generally to data transmission and more particularly to low latency data buffering.

BACKGROUND

A buffer provides a region of storage used to temporarily hold data during transmission from one location to the next. For example, buffers are used when moving data among hardware and/or processes within a computer system. A buffer is utilized when there is a mismatch in transmission and consumption rates between a transmitting entity and a receiving entity. A buffer provides temporary storage so that the transmitting entity can send data without concern for the rate at which the receiving entity is able to accept the transmitted data. The receiving entity is thus able to access data from the transmitting entity that is stored in the buffer according to the receiving entity's access and processing abilities.

The description above is presented as a general overview of related art in this field and should not be construed as an admission that any of the information it contains constitutes prior art against the present patent application.

SUMMARY

In accordance with the teachings herein, systems and methods are provided for a first-in-first-out buffer. A buffer includes a first sub-buffer configured to store data received from a buffer input, and a second sub-buffer. The second sub-buffer is configured to store data received from either the buffer input or the first sub-buffer and to output data to a buffer output in a same order as that data is received at the buffer input. Buffer control logic is configured to selectively route data from the buffer input or the first sub-buffer to the second sub-buffer so that data received at the buffer input is available to be output from the second sub-buffer in a first-in-first-out manner. The buffer control logic is responsive to an emptiness/fullness state of at least one of the first sub-buffer and the second sub-buffer.

As another example, in a method of buffering data, input data is received at a buffer input. Memory fullness/emptiness states of a first sub-buffer and a second sub-buffer are determined. Based on the memory fullness/emptiness state, data is selectively routed from the buffer input or the first sub-buffer to the second sub-buffer so that data received at the buffer input is available to be output from the second sub-buffer in a first-in-first-out manner.

As a further example, an integrated circuit includes a processor circuit, a memory circuit, and a buffer. The buffer includes a first sub-buffer configured to store data received from a buffer input and a second sub-buffer configured to store data received from either the buffer input or the first sub-buffer and to output data to a buffer output in a same order as that data is received at the buffer input. The buffer further includes buffer control logic configured to selectively route data from the buffer input or the first sub-buffer to the second sub-buffer so that data received at the buffer input is available to be output from the second sub-buffer in a first-in-first-out manner.

DETAILED DESCRIPTION

First-In-First-Out (FIFO) is a method of buffering data between a transmitting entity and a receiving entity. Buffering is useful, for example, in configurations where the transmitting entity transmits data in bursts that are greater than a consumption ability of the receiving entity and configurations where the receiving entity is subject to periods of unavailability. FIFO buffers are useful in a variety of contexts. For example, FIFO buffers are broadly used in application specific integrated circuit (ASIC) designs.

Traditional FIFO buffer implementations are subject to a number of drawbacks. For example, many FIFO buffer implementations are subject to excessive latency from the time data is transmitted to an input of the FIFO buffer to the time that data is available for access at an output of the FIFO buffer. Many FIFO buffers have a latency of at least two clock cycles between the sending of data by a transmitting entity and receipt of that data by a receiving entity.

In addition to an excessive length of the latency period, another issue arises where the latency period is not consistent across FIFO buffer implementations. For example, a flip-flop based FIFO buffer in some configurations has a different latency compared to a RAM based FIFO buffer. A change in a FIFO buffer implementation within a circuit (e.g., an addition of error-correcting code (ECC) protection) that results in a change in buffer latency requires modifications at the transmitting and/or receiving entities to account for the latency change.

Traditional FIFO buffers also suffer from timing isolation issues. For example, in an ASIC environment, it is often important that FIFO buffers be plug and play in both logical and physical aspects. This means that the FIFO buffer should not impose a timing restraint on peripheral elements. For example, when the FIFO buffer is to make data available at an output during a particular clock cycle, it is preferable that that data be made available as close to the beginning of the particular clock cycle as possible so as to not delay the receiving peripheral's access to that data.

Traditional FIFO buffers also lack a standard interface between the buffer and peripheral units (e.g., transmitting entities and receiving entities). Attempts to standardize FIFO buffer interfaces across multiple implementations often result in higher latency and/or timing isolation problems across individual FIFO buffer implementations. Traditional buffers may also implement high cost components to attempt to improve speed performance.

Figure 1:
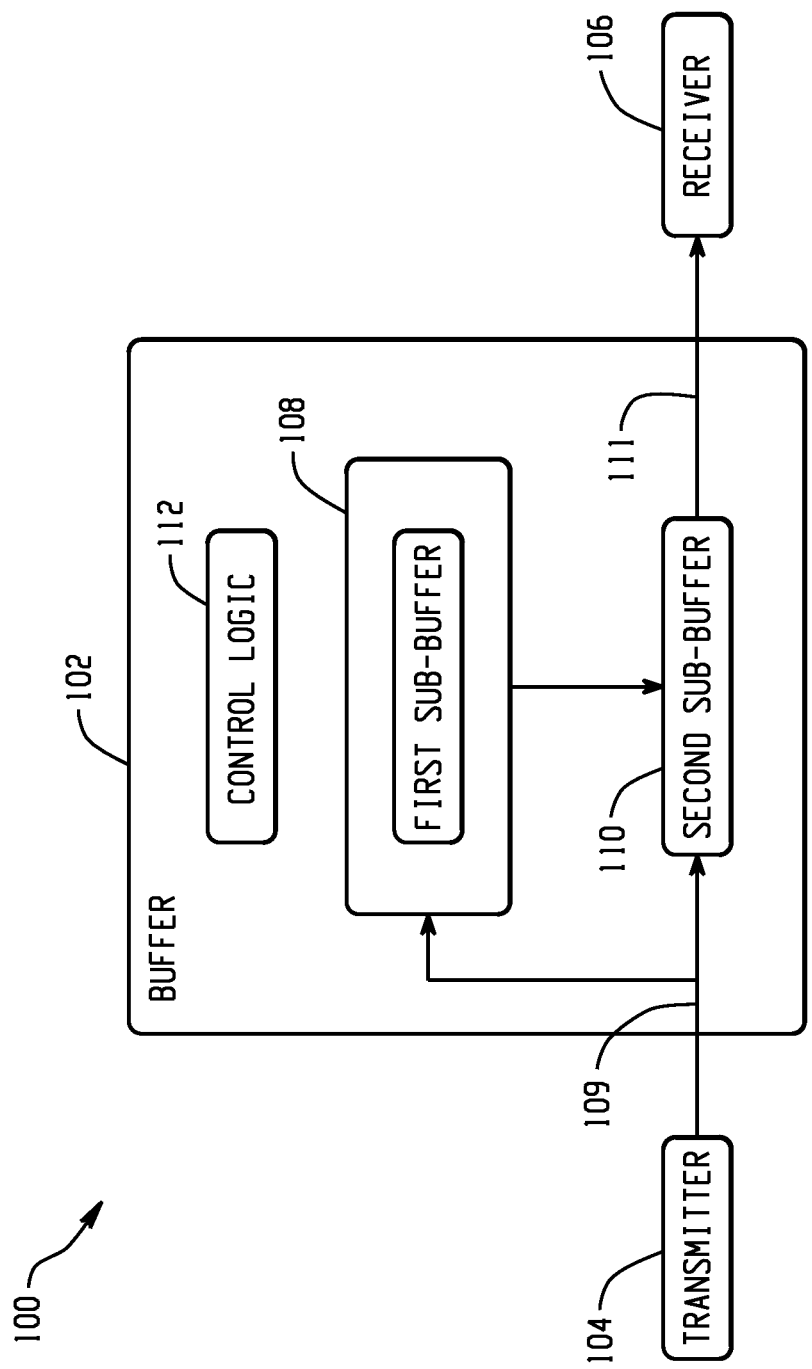
FIG. 1 is a block diagram depicting an implementation of a low latency FIFO buffer.

FIG. 1 is a block diagram depicting an implementation of a low latency FIFO buffer in accordance with an embodiment of the disclosure. A buffer 102 receives data from a transmitter 104 and transmits the received data in a first-in-first-out manner to a receiver 106. The buffer 102 includes a first sub-buffer 108 that is configured to store data received from a buffer input 109. The buffer 102 also includes a second sub-buffer 110 that is configured to store data received from either of the buffer input 109 or the first sub-buffer 108 and to output data to a buffer output 111 in a same order as the data is received at the buffer input 109. The buffer 102 further includes control logic 112 that selectively routes data from the buffer input 109 or the first-sub buffer 108 to the second sub-buffer 110 so that data received at the buffer input 109 is available to be output from the second sub-buffer 110 in a first-in-first-out manner.

The FIFO buffer 102 provides improved performance using a variety of mechanisms. For example, in some implementations, the first sub-buffer 108 has a larger amount of storage space than the second-sub buffer 110. The example first sub-buffer 108 also operates at a higher latency than the second sub-buffer 110 (e.g., the first sub-buffer provides data with a two clock cycle latency while the second sub-buffer provides data with a one clock cycle latency). The higher speed second sub-buffer 110 provides a bypass mechanism for use when the buffer 102 is empty or near empty to make data received from the transmitter 104 promptly available to the receiver 106 (e.g., with one clock cycle latency). In an embodiment, the larger, slower first sub-buffer 108 provides a less expensive storage alternative for use when the buffer 102 is not empty or near empty. The first sub-buffer 108 refills the second sub-buffer 110 as data is transmitted from the second sub-buffer 110 to the receiver 106.

In this configuration, a bottleneck that would be created by using the slower, first sub-buffer 108 alone is avoided. When the buffer 102 is near empty, the slower, first sub-buffer 108 is bypassed such that data received at the buffer input 109 is transmitted directly to the faster second sub-buffer 110 for fast access at the buffer output 111. When the buffer 102 is in a more full state, data received at the buffer input 109 is provided to the slower, first sub-buffer 108 for storage. The data stored at the slower first sub-buffer 108 is transmitted to the second sub-buffer 110 as needed to refill the second sub-buffer to continue to make data available at the buffer output 111.

The control logic 112 monitors the status of the first sub-buffer 108 and the second sub-buffer 110 and selectively routes data from the buffer input to provide fast data throughput. For example, when the buffer 102 is empty (i.e., both the first sub-buffer 108 and the second sub-buffer 110 contain no data), the control logic routes data from the buffer input 109 to the faster, second sub-buffer 110, bypassing the first-sub buffer, so that the received data is made promptly available at the buffer output 111. When the second sub-buffer 110 is full, the control logic 112 routes data from the buffer input to the first sub-buffer 108. This control scheme enables fast access to data using the second sub-buffer 110 when the buffer 102 is empty or near-empty while taking advantage of the lower cost, slower, larger storage of the first-sub buffer 108 when the buffer 102 is in a more full state.

The control logic 112 also routes data so as to maintain the first-in-first-out nature of the buffer 102. For example, the buffer control logic is configured to route data from the buffer input 109 to the first sub-buffer 108 when other data is currently stored in the first sub-buffer 108 (i.e., when the first sub-buffer 108 is not empty). This logic ensures that no data received at the buffer input jumps in front of data already stored in the first sub-buffer 108. The control logic is further configured to route data from the first sub-buffer 108 to the second sub-buffer 110 when the second sub-buffer 110 is not full. Such an operation provides a refilling effect, where the second sub-buffer 110 is replenished with the next data in line that is currently stored in the first sub-buffer 108.

Figure 2:
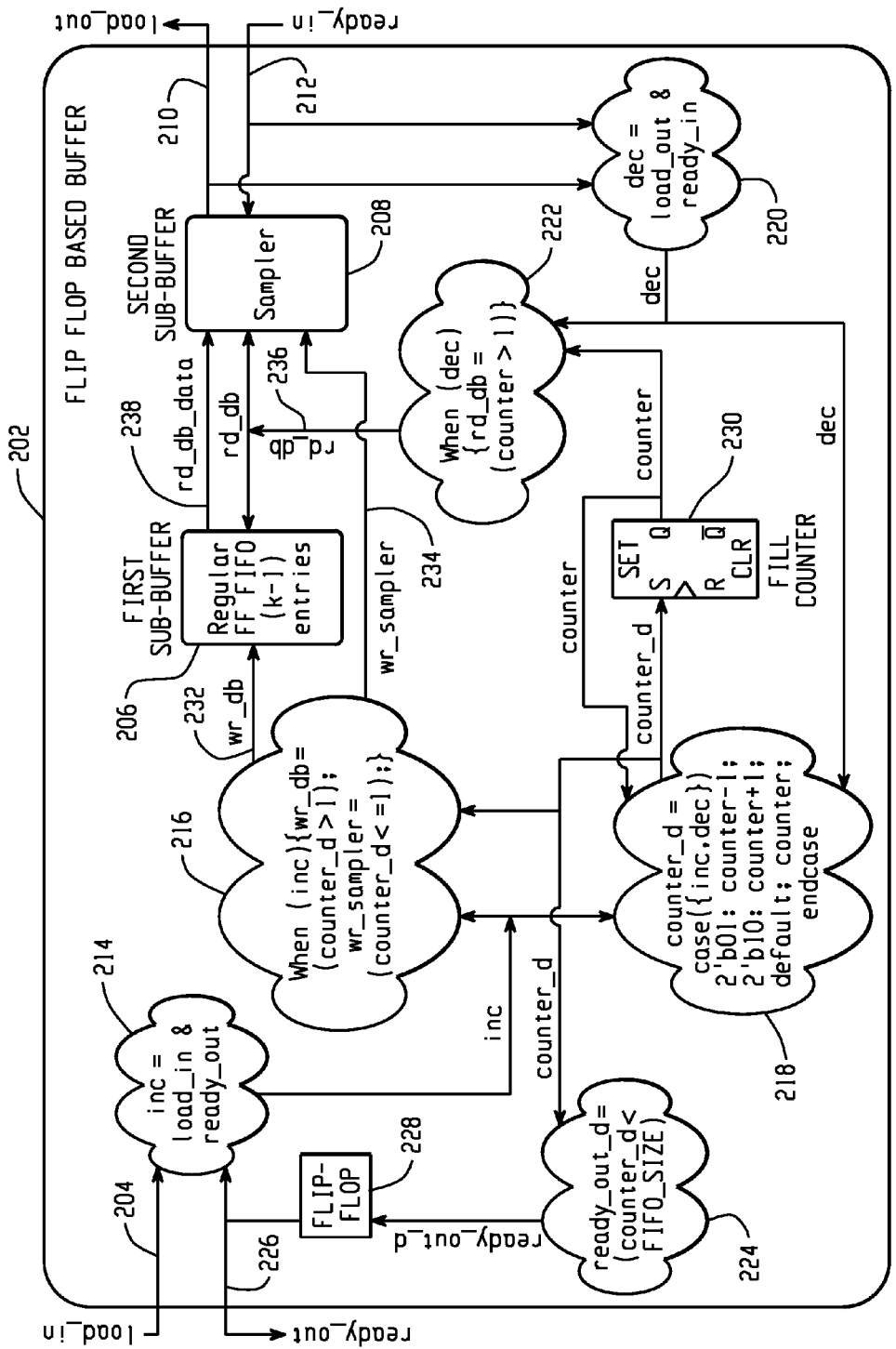
FIG. 2 is a block diagram depicting a buffer implementation embodiment having a flip-flop first sub-buffer and a sampler second sub-buffer.

FIG. 2 is a block diagram depicting a buffer implementation (a jFIFO) having a flip-flop based first sub-buffer and a sampler based second sub-buffer. The flip-flop based buffer 202 receives data via a load_in buffer input 204. The received data is selectively routed to one of a flip-flop first sub-buffer 206 and a sampler second sub-buffer 208. In one embodiment, a flip-flop first sub-buffer 206 includes an array of flip-flops and internal logic for identifying a next flip-flop in sequence and a multiplexer for accessing data from that next flip-flop upon receipt of a read request. The sampler second sub-buffer 208 samples data received on one or more inputs and transmits the detected data to the load_out output 210 with low latency (e.g., within one clock cycle of a read request from the ready_in input 212). The sampler 208 provides desired timing isolation characteristics for the buffer 202 because no logic circuitry is present in an embodiment within the common sampler/flip-flop based buffer output 210 (i.e., in contrast to a conventional flip-flop based buffer which includes multiplexer-flip-flop selection logic between the flip-flop storage elements and the flip-flop based buffer output).

The flip-flop based buffer 202 further includes buffer control logic 214, 216, 218, 220, 222, 224 that selectively routes data from the buffer input 204 or the first sub-buffer 206 to the second sub-buffer 208 to enable first-in-first-out data transfer. In the example of FIG. 2, control logic 214 sets an increment field (inc) based on the buffer input 204 and a ready signal 226. The ready signal 226, as provided by a flip-flop 228 is output from the flip-flop based buffer 202 to indicate to a transmitting entity that the buffer 202 is ready to receive data. The inc data signal is received by control logic 216, which determines whether the inc data signal will be routed to the first sub-buffer 206 via 232 or the second sub-buffer 208 via 234. The routing of the inc data signal is determined using a count maintained at a fill counter 230. When the count is greater than one, where one is chosen based on a second sub-buffer 208 capacity of one storage location, the inc data signal is routed to the first sub-buffer 206 for storage. When the count is less than or equal to one, the control logic routes the inc data signal directly to the second sub-buffer 208, bypassing the first sub-buffer. Upon receipt of the inc data signal, control logic 218 updates the count value stored in the counter 230. When the inc data signal is received (i.e. case 1, 0), the counter is incremented by one.

Upon receipt of a ready signal 212, the second sub-buffer 208 transmits data via the buffer output 210. Control logic 220 commands that the count of data in the buffer 202 is decremented when the buffer output 210 and buffer read request 212 lines are active using the decrement (dec) data signal. The dec data signal is transmitted to control logic 218 for adjustment of the count. Upon receipt of the dec data signal, control logic 218 updates the count value stored in the counter 230. When the dec data signal is received by control logic 218 (i.e. case 0, 1), the counter is decremented by one. The dec data signal is also received by control logic 222 along with the count from the counter 230 to determine whether the second sub-buffer 208 should be refilled with data from the first sub-buffer 206. When the counter is greater than one, signifying the presence of data in the first sub-buffer, a refill signal is transmitted via 236 to the first sub-buffer 206 and the second sub-buffer 208 commanding that the next-in-line data in the first sub-buffer 206 be transmitted to the second sub-buffer 208 via 238.

The counter update provided by control logic 218 is also transmitted to control logic 224 for generation of the buffer ready signal 226. When the counter update signifies a value less than the total buffer size (i.e., the sum of the storage size of the first sub-buffer 206 and the second sub-buffer 208), the ready signal is transmitted to the ready output 226 via flip flop 228. When the counter update is not less than the total buffer size, then the ready output 226 indicates a full buffer 202 that cannot accept new data.

Figure 3:
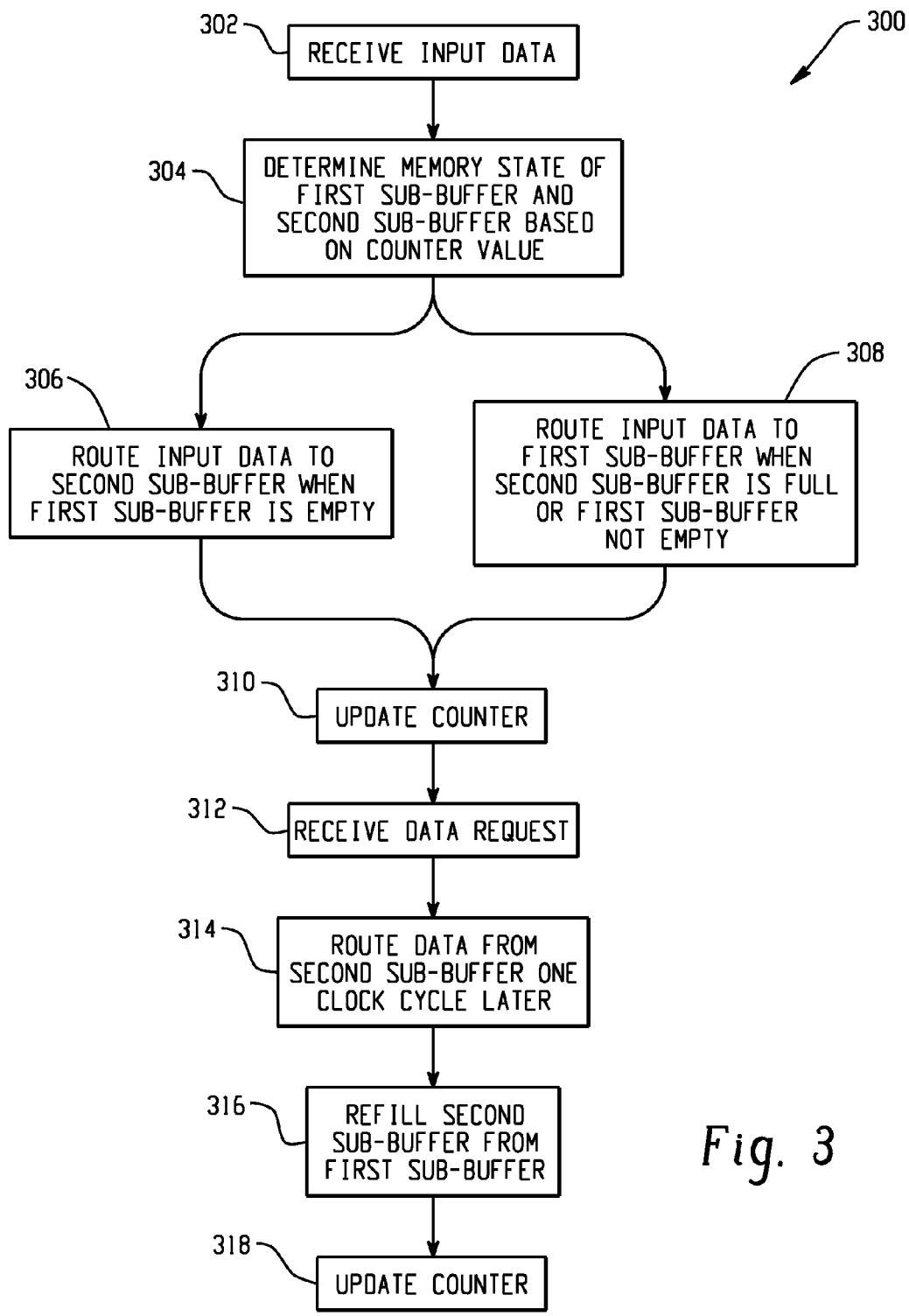
FIG. 3 is a flow diagram depicting a method of buffering data.

FIG. 3 is a flow diagram depicting a method of buffering data. At 302, input data is received at a buffer input. Memory fullness/emptiness states are determined for the first sub-buffer and the second sub-buffer at 304, such as through use of a count value. Based on the memory fullness/emptiness states, data is selectively routed from the buffer input or the first sub-buffer to the second sub-buffer so that data received at the buffer input is available to be output from the second sub-buffer in a first-in-first-out manner. For example, when the first sub-buffer is empty, the input data is transmitted directly to the second sub-buffer at 306, bypassing the first sub-buffer. When the first sub-buffer is not empty or when the second sub-buffer is full, the input data is transmitted to the first sub-buffer at 308. Upon receipt of data, the count value is updated at 310. At 312, a data request is received. Upon receipt of the request, data is transmitted from the second sub-buffer at 314 (e.g., within one clock cycle of receipt of the read request). At 316, the second sub-buffer is refilled with data from the first sub-buffer, and the counter is updated to reflect the outputted data at 318.

Figure 4:
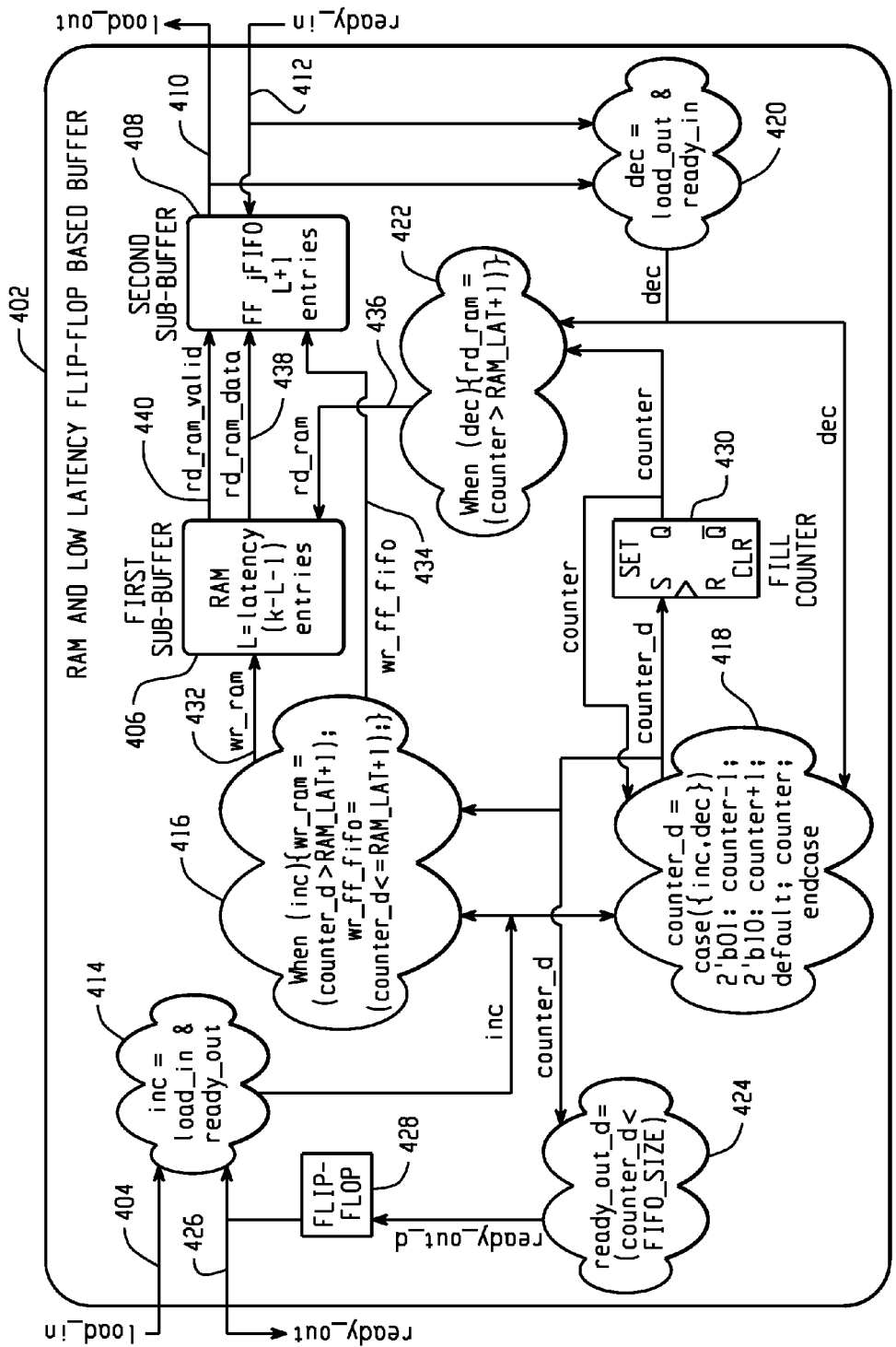
FIG. 4 is a block diagram depicting a random access memory (RAM) and low latency flip-flop based buffer embodiment.

FIG. 4 is a block diagram depicting a random access memory (RAM) and low latency flip-flop based buffer. The RAM and flip-flop based buffer 402 (another jFIFO implementation) receives data via a load_in buffer input 404. The received data is selectively routed to one of a RAM based first sub-buffer 406 (pre-buffer) and a low latency flip-flop based second sub-buffer 408. The RAM based first sub-buffer 406 includes an array of memory locations and internal logic for identifying a next memory location in sequence and a multiplexer for accessing data from the next memory location upon receipt of a read request. The low latency flip-flop based second sub-buffer 408 receives data via one or more inputs and transmits the received data to the load_out output 410 with low latency (e.g., within one clock cycle or a read request from the ready_in input 412). Low latency flip-flop based second sub-buffers take a variety of forms. For example, a jFIFO flip-flop based buffer, such as described above with respect to FIG. 2, is used as the second sub-buffer 408 in the example of FIG. 4.

The buffer 402 further includes buffer control logic 414, 416, 418, 420, 422, 424 that selectively routes data from the buffer input 404 or the first sub-buffer 406 to the second sub-buffer 408 to enable first-in-first-out data transfer as well as other operations. In the example of FIG. 4, control logic 414 sets an increment field (inc) based on the buffer input 404 and a ready signal 426. The ready signal, as transmitted by a flip-flop 428 is output from the buffer 402 to indicate to a transmitting entity that the buffer 402 is ready to receive data. The inc data signal is received by control logic 416, which determines whether the inc data signal will be routed to the first sub-buffer 406 via 432 or the second sub-buffer 408 via 434. The routing of the inc data signal is determined using a count maintained at a fill counter 430. In the example of FIG. 4, the routing of the inc data signal is determined by control logic 416 based on the count value and the latency of the RAM based first sub-buffer 406. When the count is less than the first sub-buffer latency plus one, then the inc data signal is routed directly to the second sub-buffer 208. When the count is greater than the first sub-buffer latency plus one, then the inc data signal is routed to the first sub buffer 406. Upon receipt of the inc data signal, control logic 418 updates the count value stored in the counter 430. When the inc data signal is received (i.e. case 1, 0), the counter is incremented by one.

Upon receipt of a ready signal 412, the second sub-buffer 408 transmits data via the buffer output 410. Control logic 420 commands that the count of data in the buffer 402 is decremented when the buffer output 410 and buffer read request 412 lines are active using the decrement (dec) data signal. The dec data signal is transmitted to control logic 418 for adjustment of the count. Upon receipt of the dec data signal, control logic 418 updates the count value stored in the counter 430. When the dec data signal is received by control logic 418 (i.e. case 0, 1), the counter is decremented by one. The dec data signal is also received by control logic 422 along with the count from the counter 430 to determine whether the second sub-buffer 408 should be refilled with data from the first sub-buffer 406. When the count is greater than the first sub-buffer latency plus one, a refill signal is transmitted via 436 to the first sub-buffer 406 and the second sub-buffer 408 commanding that the next-in-line data in the first sub-buffer 406 be transmitted to the second sub-buffer 408 via 438. The first sub-buffer 406 transmits a data validity signal 440 that indicates that the data at 438 is valid for reading by the second sub-buffer 408.

The counter update provided by control logic 418 is also transmitted to control logic 424 for generation of the buffer ready signal 426. When the counter update signifies a value less than the total buffer size (i.e., the sum of the storage size of the first sub-buffer 406 and the second sub-buffer 408), the ready signal is transmitted to the ready output 426 via flip flop 428. When the counter update is not less than the total buffer size, then the ready output 426 indicates a full buffer 402 that cannot accept new data.

Figure 5:
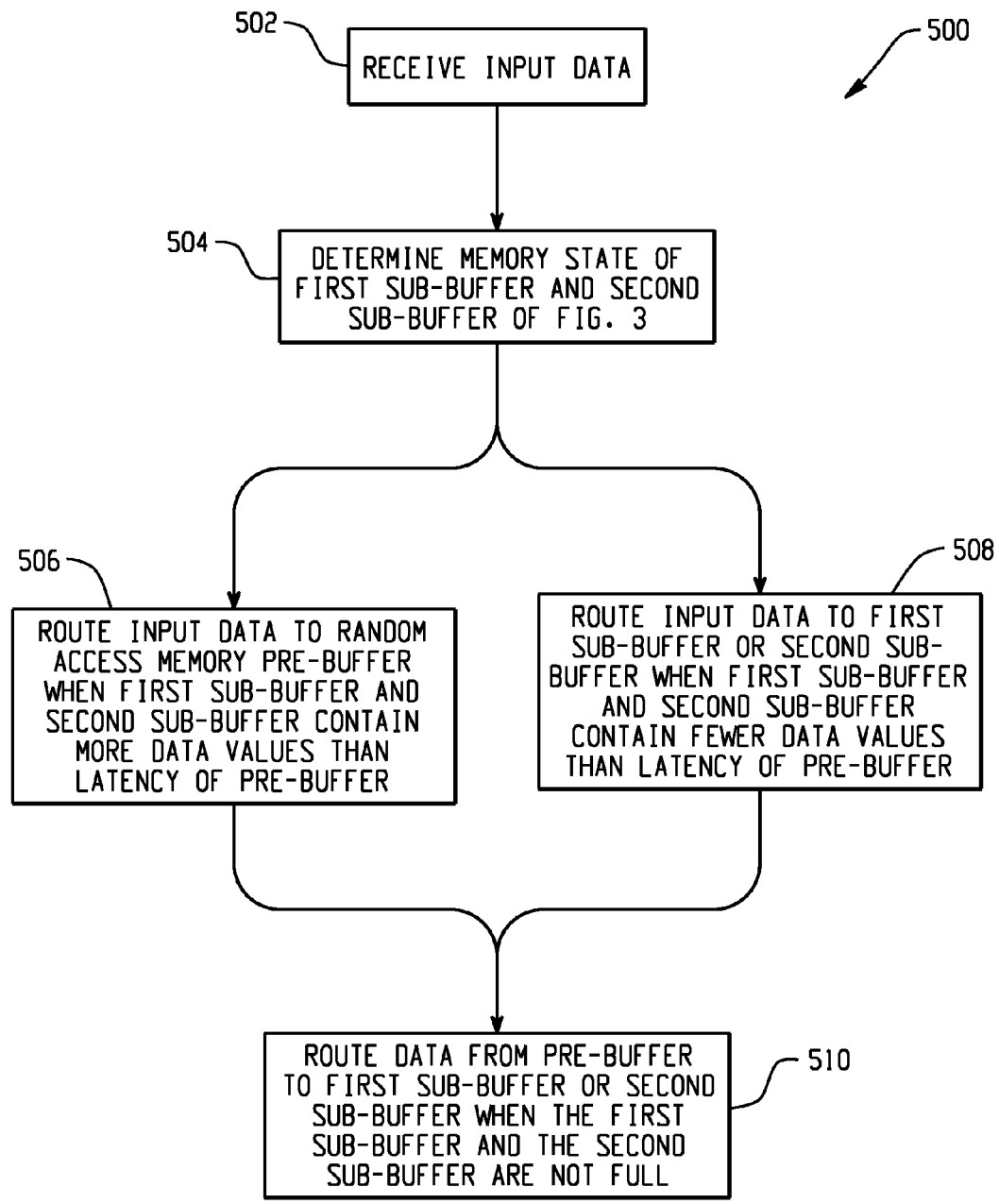
FIG. 5 is a flow diagram depicting a method of buffering data using a pre-buffer.

FIG. 5 is a flow diagram depicting a method of buffering data using a pre-buffer to augment the method of FIG. 3. Input data is received at 502. At 504, memory fullness/emptiness states of the first sub-buffer and the second sub-buffer are determined, as described in FIG. 3. At 506, the input data is transmitted to a random access memory pre-buffer when the first sub-buffer and the second sub-buffer contain more data values than a number of clock cycle latency of the pre-buffer (e.g., the first sub-buffer and second sub-buffer contain 4 data values, and the RAM based pre-buffer has a 2 clock cycle latency). At 508, the input data is transmitted to one of the first sub-buffer or the second sub-buffer when the first sub-buffer and the second sub-buffer contain more data values than the number of clock cycle latency of the pre-buffer (e.g., according to the control logic depicting in FIG. 4 at 416). At 510, data is routed from the pre-buffer to the first sub-buffer or the second sub-buffer when the first sub-buffer and the second sub-buffer are not full.

Figure 6:
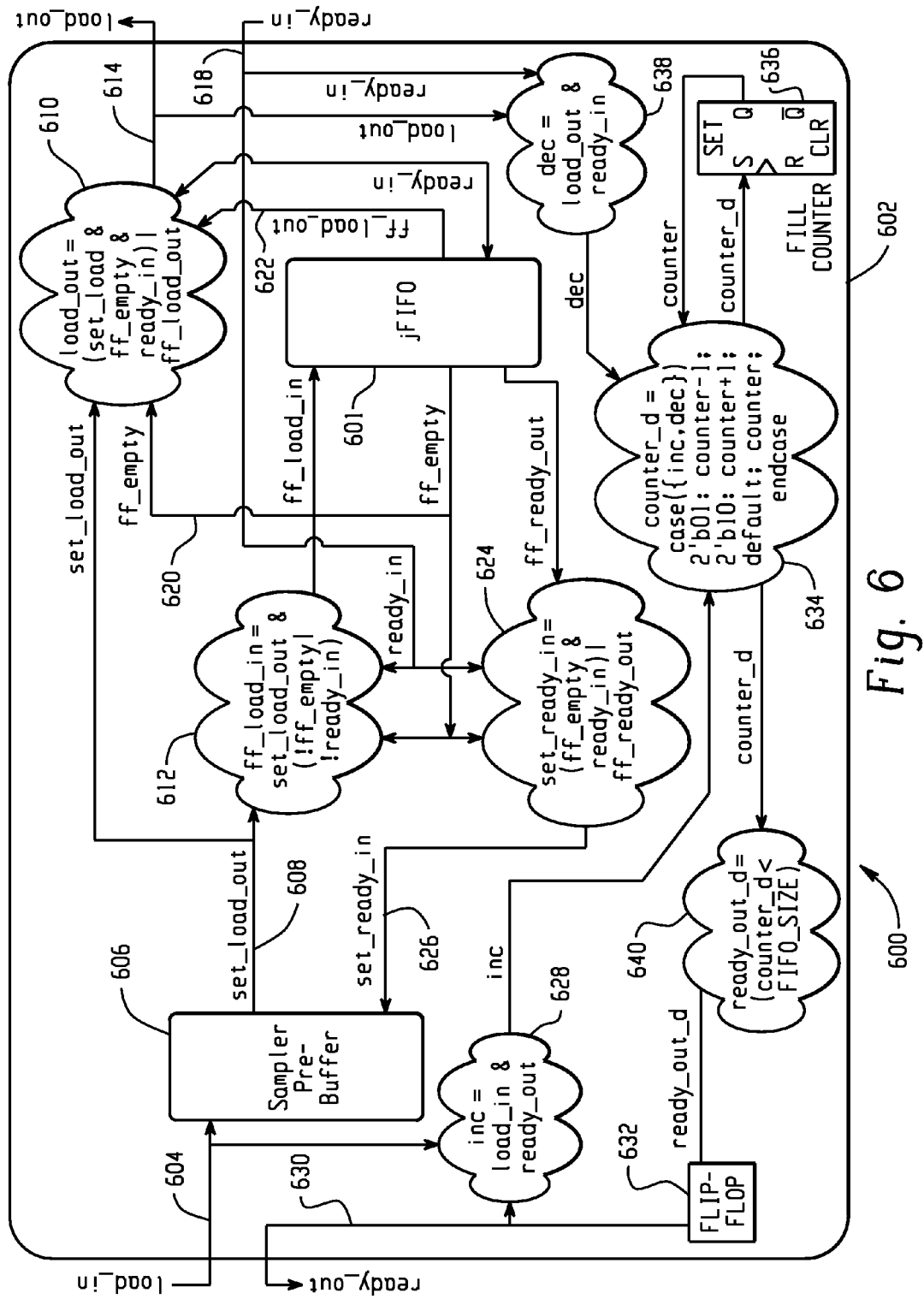
FIG. 6 is a block diagram depicting a RAM or flip-flop based buffer embodiment with an associated sampler pre-buffer.

FIG. 6 is a block diagram depicting a RAM or flip-flop based buffer (jFIFO) with an associated sampler pre-buffer. The jFIFO 601 may take a variety of forms, such as that of one of the buffers described above in reference to FIGS. 2 and 4. The buffer 602 receives data via a load_in buffer input 604. The received data is routed to the sampler pre-buffer 606, which samples the input data from 604 and outputs samples of that input data at 608. The sampled data at 608 is transmitted to both control logic 610 and control logic 612. Control logic 610 provides the sampled data from 608 to the buffer output 614 when the jFIFO 601 is empty and data is requested via the ready_in line 618. The state of the jFIFO 601 is transmitted to control logic 610 via 620. When the jFIFO 601 is not empty, data from the jFIFO 601 is provided to the buffer output 614 through control logic 610 via 622.

Control logic 612 determines whether the sampled data at 608 should be input to the jFIFO 601. Control logic 612 adds the sampled data 608 to the jFIFO 601 when the jFIFO 601 is not full and also when the buffer 602 is not ready to transmit, as indicated by the ready input 618. Control logic 624 determines whether the set_ready_in line 626 should be activated, which commands the pre-sampler to sample and output data. The set_ready_in line 626 and the pre-sampler 606 are activated when the jFIFO 601 is empty and the buffer ready input 618 is active (i.e., for transmission directly to the buffer output 614) or when the jFIFO 601 is not full and is available for filling/refilling from the pre-sampler output 608.

In the example of FIG. 6, control logic 628 sets an increment field (inc) based on the buffer input 604 and a ready signal 630. The ready signal, as transmitted by a flip-flop 632 is output from the buffer 602 to indicate to a transmitting entity that the buffer 602 is ready to receive data. The inc data signal is received by control logic 634, which updates a count value stored in the counter 636. When the inc data signal is received (i.e. case 1, 0), the counter is incremented by one.

Upon receipt of a ready signal 618 (read request), control logic 638 commands that the count of data is decremented when the buffer output 614 and buffer read request 618 lines are active using the decrement (dec) data signal. The dec data signal is transmitted to control logic 634 for adjustment of the count. Upon receipt of the dec data signal, control logic 634 updates the count value stored in the counter 636. When the dec data signal is received by control logic 634 (i.e. case 0, 1), the counter is decremented by one.

The counter update provided by control logic 634 is also transmitted to control logic 640 for generation of the buffer ready signal 630. When the counter update signifies a value less than the jFIFO 601 buffer size, the ready signal is transmitted to the ready output 630 via flip flop 632. When the counter update is not less than the total buffer size, then the ready output 630 indicates a full buffer 602 that cannot accept new data. In one embodiment, the buffer relies on the jFIFO 601 to identify its fullness/emptiness memory state (e.g., using an internal counter of the jFIFO 601). In such an embodiment, the buffer 602 does not include certain elements depicted in FIG. 6, such as the counter 636.

Figure 7:
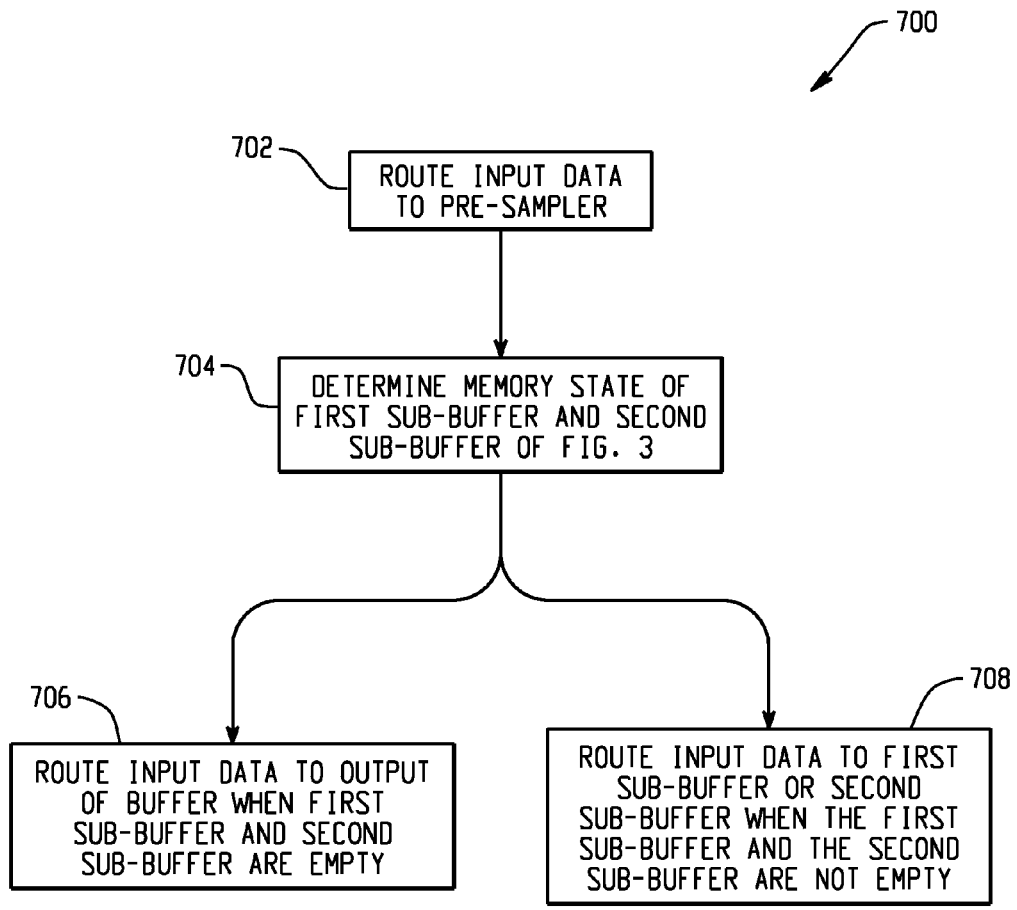
FIG. 7 is a flow diagram depicting a method of buffering data.

FIG. 7 is a flow diagram depicting a method of buffering data. At 702, input data is provided to a pre-sampler. At 704, the fullness/emptiness memory state of a first sub-buffer and a second sub-buffer, such as those contained within the jFIFO circuits described with respect to FIGS. 2 and 4, is determined, such as using the process described in FIG. 3. At 706, the input data is provided to the output of the buffer when the first sub-buffer and the second sub-buffer are determined to be empty. At 708, the input data is provided to one of the first-sub buffer and the second sub-buffer when a non-empty state is determined at 704.

Figure 8:
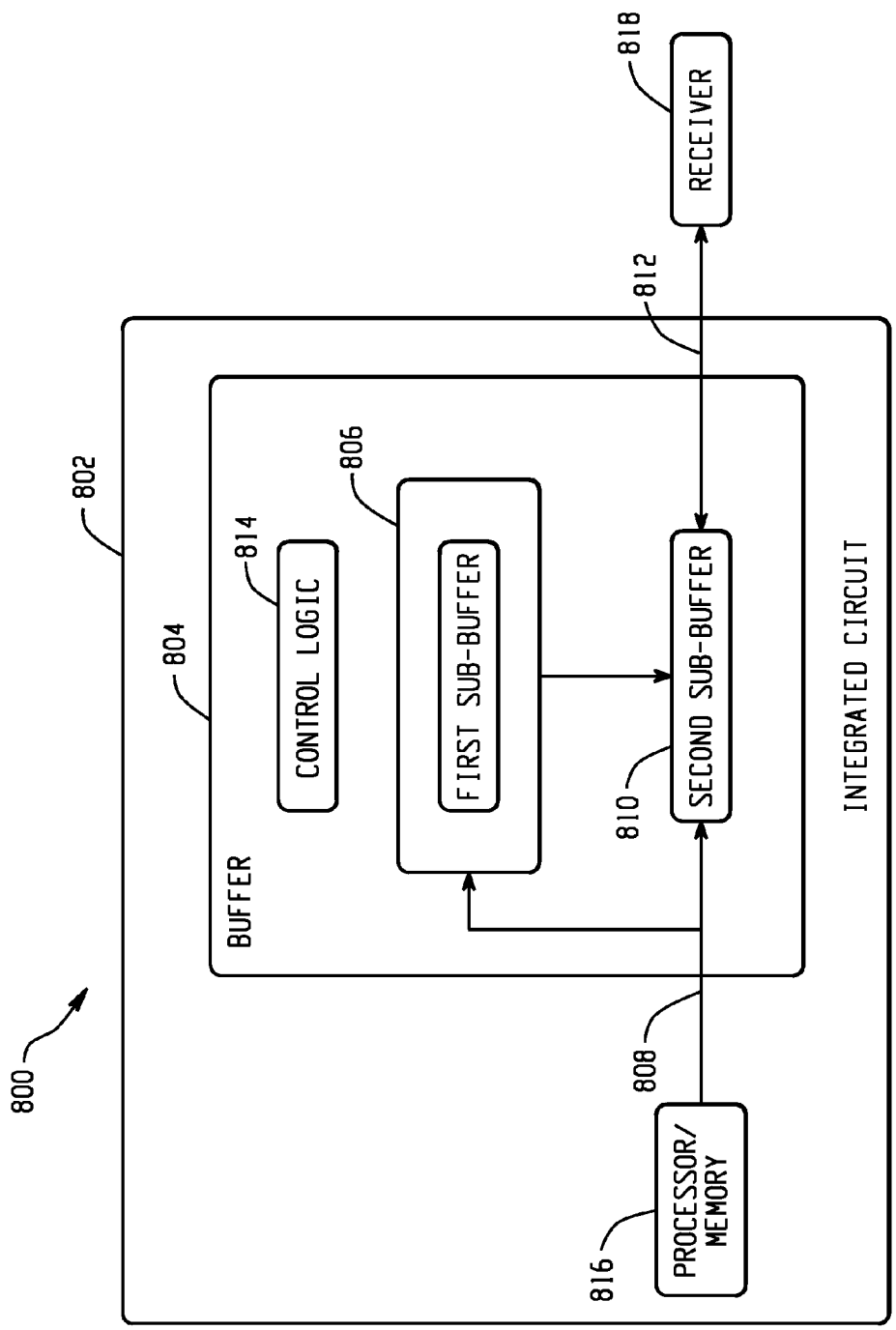
FIG. 8 is a block diagram depicting a buffer integrated circuit embodiment.

FIG. 8 is a block diagram depicting an integrated circuit embodiment. An integrated circuit 802 includes a buffer 804, where the buffer includes a first sub-buffer 806 configured to store data received from a buffer input 808. The buffer 804 further includes a second sub-buffer 810 configured to store data received from either the buffer input 808 or the first sub-buffer 806. The second sub-buffer 810 is further configured to output data to a buffer output 812 in a same order as that data is received at the buffer input 808. The buffer 804 further includes buffer control logic 814 that is configured to selectively route data from the buffer input 808 or the first sub-buffer 806 to the second sub-buffer 810 so that data received at the buffer input 808 is available to be output from the second sub-buffer 810 in a first-in-first-out manner. The buffer 804 may facilitate communication between a variety of components. For example, the buffer 804 may buffer communication from a processor, memory, or other circuit 816 to a receiver 818 that may be a component of the integrated circuit 802 or a component external to the integrated circuit 802.

Figure 9:
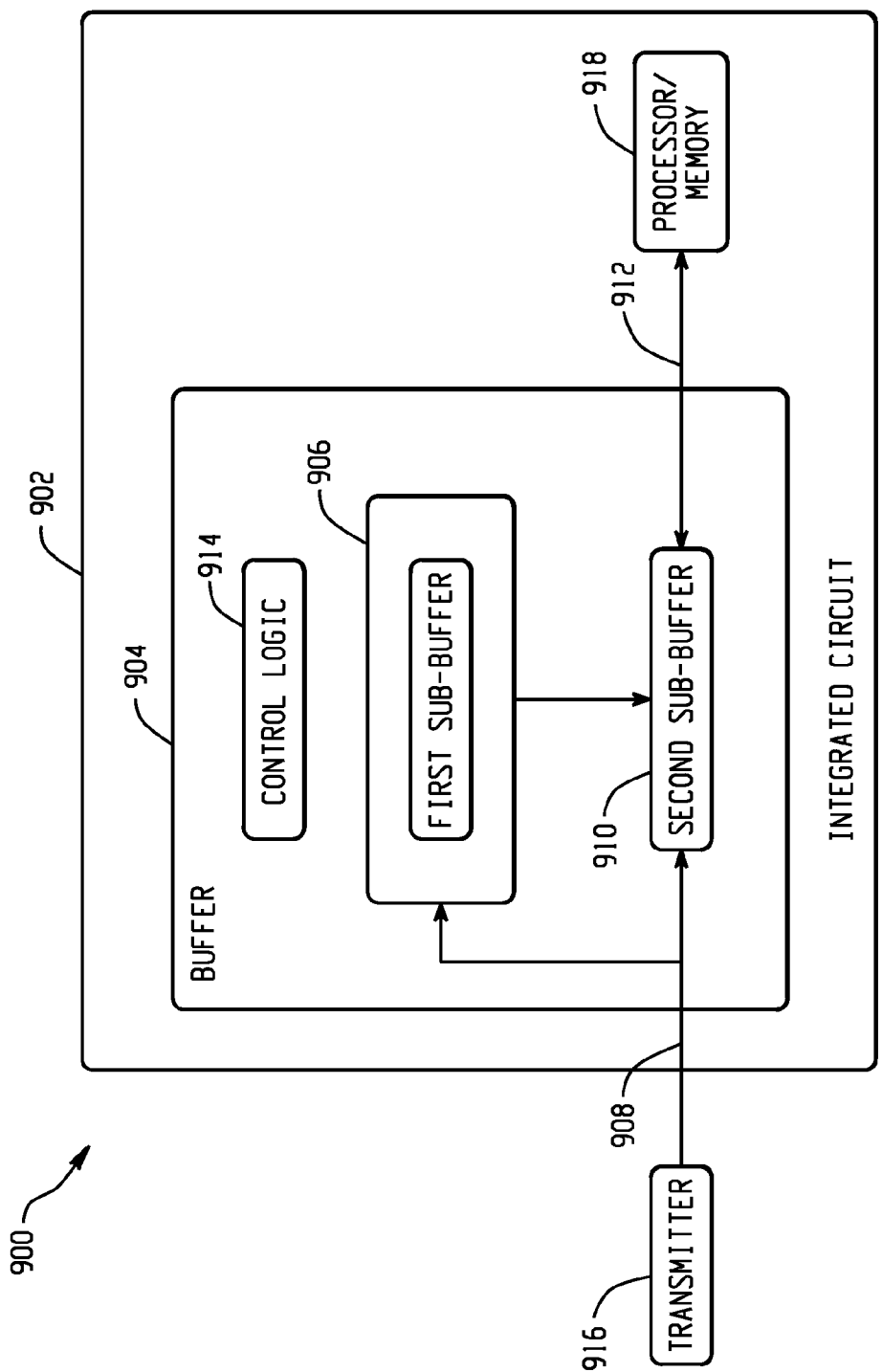
FIG. 9 is a block diagram depicting another integrated circuit embodiment.

FIG. 9 is a block diagram depicting another integrated circuit embodiment. An integrated circuit 902 includes a buffer 904, where the buffer includes a first sub-buffer 906 configured to store data received from a buffer input 908. The buffer 904 further includes a second sub-buffer 910 configured to store data received from either the buffer input 908 or the first sub-buffer 906. The second sub-buffer 910 is further configured to output data to a buffer output 912 in a same order as that data is received at the buffer input 908. The buffer 904 further includes buffer control logic 914 that is configured to selectively route data from the buffer input 908 or the first sub-buffer 906 to the second sub-buffer 910 so that data received at the buffer input 908 is available to be output from the second sub-buffer 910 in a first-in-first-out manner. The buffer 904 may facilitate communication between a variety of components. For example, the buffer 904 may buffer communication from a transmitter 916 to a processor, memory, or other circuit 918, where the transmitter may be a component of the integrated circuit 902 or a component external to the integrated circuit 902.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

For example, the systems and methods may utilize data signals conveyed via networks (e.g., local area network, wide area network, internet, combinations thereof, etc.), fiber optic medium, modulated carrier waves, wireless networks, etc. for communication with one or more data processing devices. The data signals can carry any or all of the data disclosed herein that is provided to or from a device.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Additionally, use of the term "each" does not necessarily mean "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A buffer comprising:
   a buffer input;
   a buffer output;
   a first sub-buffer;
   a second sub-buffer, the second sub-buffer having less storage capacity than the first sub-buffer, the second sub-buffer having a first sub-input and a second sub-input to receive data directly from the buffer input and the first sub-buffer, respectively, a latency of the second sub-buffer for transferring data being less than a latency of the first sub-buffer for transferring data;
   a fill counter configured to store a buffer fill count that indicates a total amount of data stored across the first sub-buffer and the second sub-buffer, the fill counter configured to increment the buffer fill count each time a data value is transmitted directly from the buffer input to the first sub-buffer, to increment the buffer fill count each time a data value is transmitted directly from the buffer input to the second sub-buffer, and to decrement the buffer fill count each time a data value is output through the buffer output; and
   a controller configured to access the buffer fill count and route data among the first sub-buffer and the second sub-buffer using the buffer fill count, the controller being configured to:
   route data, received through the buffer input, to the first sub-buffer when the buffer fill count indicates that the second sub-buffer is full,
   route the received data from the buffer input to the second sub-buffer, bypassing the first sub-buffer, when the buffer fill count indicates that the second sub-buffer is not full;
   route data from the second sub-buffer to the buffer output when a data request is received by the controller; and
   following the data request, route data from the first sub-buffer to the second sub-buffer when the buffer fill count indicates that the first sub-buffer contains data.

2. The buffer of claim 1, wherein the first fill level threshold corresponds to data capacity of the second sub-buffer.

3. The buffer of claim 1, further comprising a sampler configured to sample the received data before the received data is routed to the first sub-buffer or the second sub-buffer.

4. The buffer of claim 1, wherein the first sub-buffer comprises a series of flip-flops.

5. The buffer of claim 1, wherein the second sub-buffer comprises a sampler.

6. The buffer of claim 1, wherein the controller is configured to output the received data through the buffer output in the same order that the received data was received through the buffer input.

7. A method for buffering data in a first in first out order, the method comprising:
   receiving data through a buffer input;
   storing a buffer fill count that indicates a total amount of data stored across a first sub-buffer and a second sub-buffer, the second sub-buffer having a first sub-input and a second sub-input to receive data directly from the buffer input and the first sub-buffer, respectively, the buffer fill count being incremented each time a data value is transmitted directly from the buffer input to the first sub-buffer, the buffer fill count being incremented each time a data value is transmitted directly from the buffer input to the second sub-buffer, and the buffer fill count being decremented each time a data value is output through a buffer output;
   routing the received data to the first sub-buffer when the buffer fill count indicates that the second sub-buffer is full;
   routing the received data to the second sub-buffer, and bypassing the first sub-buffer, when the buffer fill count indicates that the second sub-buffer is not full;
   routing data from the second sub-buffer to the buffer output when a data request is received by the controller; and
   following the data request, routing data from the first sub-buffer to the second sub-buffer when the buffer fill count indicates that the first sub-buffer contains data.

8. The method of claim 7, wherein the first fill level threshold corresponds to data capacity of the second sub-buffer.

9. The method of claim 7, further comprising:
   sampling the received data before the received data is routed to the first sub-buffer or the second sub-buffer.

10. The method of claim 7, wherein the first sub-buffer comprises a series of flip-flops.

11. The method of claim 7, wherein the second sub-buffer comprises a sampler.

12. The method of claim 7, wherein the routing steps are configured to output the received data through the buffer output in the same order that the received data was received through the buffer input.

* * * * *